US010495060B2

(12) United States Patent
Caruso et al.

(10) Patent No.: US 10,495,060 B2
(45) Date of Patent: Dec. 3, 2019

(54) WIND TURBINE CONTROL SYSTEM HAVING A THRUST SENSOR

(75) Inventors: Silvestro Caruso, London (GB);
Martin Jakubowski, London (GB);
Luciano Caioli, London (GB)

(73) Assignee: Seawind Ocean Technology Holding BV, Amesterdam (NL)

( * ) Notice: Subject to any disclaimer, the term of this patent is extended or adjusted under 35 U.S.C. 154(b) by 510 days.

(21) Appl. No.: 14/119,959

(22) PCT Filed: May 25, 2012

(86) PCT No.: PCT/IB2012/001106
§ 371 (c)(1),
(2), (4) Date: Apr. 15, 2014

(87) PCT Pub. No.: WO2012/164387
PCT Pub. Date: Dec. 6, 2012

(65) Prior Publication Data
US 2014/0219796 A1    Aug. 7, 2014

Related U.S. Application Data

(60) Provisional application No. 61/490,765, filed on May 27, 2011.

(51) Int. Cl.
*F03D 7/02* (2006.01)
*F03D 7/04* (2006.01)

(52) U.S. Cl.
CPC ......... *F03D 7/0244* (2013.01); *F03D 7/0208* (2013.01); *F03D 7/0224* (2013.01); *F03D 7/042* (2013.01)

(58) Field of Classification Search
CPC ... Y02E 10/723; Y02E 10/725; F03D 7/0224; F03D 7/0204
USPC ................................ 290/44, 55; 416/1, 9, 32
See application file for complete search history.

(56) References Cited

U.S. PATENT DOCUMENTS

| | | | |
|---|---|---|---|
| 4,364,708 A * | 12/1982 | David ................. | F03D 1/0658 416/132 B |
| 4,435,646 A | 3/1984 | Coleman et al. | |
| 4,439,105 A | 3/1984 | Hohenemser | |
| 4,565,929 A | 1/1986 | Baskin et al. | |

(Continued)

FOREIGN PATENT DOCUMENTS

| | | |
|---|---|---|
| CN | 201771692 U | 3/2011 |
| DE | 20205396 U1 | 11/2002 |

(Continued)

OTHER PUBLICATIONS

Carlin et al., 2001, The History and State of the Art of Variable-Speed Wind Turbine Technology, National Renewable Energy Laboratory, (68 pages).

(Continued)

*Primary Examiner* — Charles Reid, Jr.
(74) *Attorney, Agent, or Firm* — Themis Law

(57) ABSTRACT

A wind turbine control system includes a thrust sensor and a braking system, and allows an increase in wind rotor load to be detected instantaneously and corrective action to be initiated. The system includes additional features such as deceleration control. In one embodiment, a turbine controller regulates the rate of deceleration of the rotor shaft.

9 Claims, 3 Drawing Sheets

(56) References Cited

U.S. PATENT DOCUMENTS

| | | | |
|---|---|---|---|
| 4,703,189 A | 10/1987 | DiValentin et al. | |
| 4,815,936 A | 3/1989 | Stoltze et al. | |
| 5,354,175 A * | 10/1994 | Coleman | F03D 1/0658 |
| | | | 416/134 R |
| 6,361,275 B1 | 3/2002 | Wobben | |
| 6,420,795 B1 | 7/2002 | Mikhail et al. | |
| 6,688,841 B1 * | 2/2004 | Wobben | F03D 7/0224 |
| | | | 415/1 |
| 6,724,097 B1 * | 4/2004 | Wobben | F03D 9/003 |
| | | | 290/44 |
| 8,022,566 B2 * | 9/2011 | Loh | F03D 7/0224 |
| | | | 290/44 |
| 8,108,997 B2 * | 2/2012 | Weaver | F03D 1/001 |
| | | | 29/402.03 |
| 2002/0047277 A1 | 4/2002 | Willis et al. | |
| 2003/0068104 A1 | 4/2003 | Loftus | |
| 2003/0165379 A1 * | 9/2003 | Wobben | F03D 17/00 |
| | | | 415/1 |
| 2004/0037697 A1 * | 2/2004 | Sanborn | F02C 9/00 |
| | | | 415/118 |
| 2004/0151584 A1 | 8/2004 | Blakemore | |
| 2004/0258521 A1 * | 12/2004 | Wobben | F03D 7/0224 |
| | | | 416/37 |
| 2006/0070435 A1 | 4/2006 | LeMieux et al. | |
| 2009/0162202 A1 * | 6/2009 | Nies | F03D 7/0244 |
| | | | 416/147 |
| 2009/0174187 A1 * | 7/2009 | Nyborg | F03D 7/0224 |
| | | | 290/44 |
| 2010/0109327 A1 * | 5/2010 | Nielsen | F03D 7/0204 |
| | | | 290/44 |
| 2010/0133823 A1 * | 6/2010 | Schramm | F03D 7/0248 |
| | | | 290/44 |
| 2010/0133827 A1 | 6/2010 | Huang et al. | |
| 2010/0194114 A1 * | 8/2010 | Pechlivanoglou | F03D 7/0248 |
| | | | 290/55 |
| 2010/0203983 A1 | 8/2010 | Stites | |
| 2010/0207396 A1 * | 8/2010 | Simon | H02P 9/06 |
| | | | 290/55 |
| 2010/0226772 A1 | 9/2010 | Deering | |
| 2010/0280733 A1 * | 11/2010 | Jordan, Jr. | F01D 21/00 |
| | | | 701/100 |
| 2010/0308584 A1 * | 12/2010 | Coates | H02J 3/32 |
| | | | 290/44 |
| 2010/0314873 A1 * | 12/2010 | Stone | F03D 7/0248 |
| | | | 290/44 |
| 2011/0084485 A1 * | 4/2011 | Miranda | F03D 7/0224 |
| | | | 290/44 |
| 2011/0210551 A1 * | 9/2011 | Scholte-Wassink | H02P 3/04 |
| | | | 290/44 |
| 2012/0027586 A1 * | 2/2012 | Hoffmann | F03D 7/0224 |
| | | | 416/1 |
| 2013/0161955 A1 * | 6/2013 | Dalsgaard | F03D 7/0224 |
| | | | 290/44 |
| 2013/0214535 A1 * | 8/2013 | Brath | F03D 7/0264 |
| | | | 290/44 |
| 2014/0000992 A1 * | 1/2014 | Tajima | F16D 65/18 |
| | | | 188/72.1 |
| 2014/0212288 A1 | 7/2014 | Jakubowski et al. | |
| 2014/0217238 A1 | 8/2014 | Jakubowski et al. | |
| 2014/0217742 A1 | 8/2014 | Caruso et al. | |
| 2014/0219796 A1 | 8/2014 | Caruso et al. | |
| 2014/0226926 A1 | 8/2014 | Caruso et al. | |

FOREIGN PATENT DOCUMENTS

| | | | |
|---|---|---|---|
| EP | 0995904 A2 | 4/2000 | |
| EP | 1134410 A1 | 9/2001 | |
| EP | 1890034 A1 | 2/2008 | |
| EP | 2128431 A2 | 12/2009 | |
| EP | 2302206 A1 | 3/2011 | |
| GB | 2107794 A | 5/1983 | |
| JP | 2006-207502 A | 8/2006 | |
| WO | 2002/079647 A1 | 10/2002 | |
| WO | WO-2008032215 A2 * | 3/2008 | F01D 3/04 |
| WO | 2009/080047 A2 | 7/2009 | |
| WO | 2009/132671 A2 | 11/2009 | |
| WO | 2010/072190 A2 | 7/2010 | |
| WO | 2010/128378 A2 | 11/2010 | |
| WO | 2011/042369 A2 | 4/2011 | |
| WO | 2012/150502 A1 | 11/2012 | |
| WO | 2012/150502 A4 | 11/2012 | |
| WO | 2012/153185 A1 | 11/2012 | |
| WO | 2012/153197 A2 | 11/2012 | |
| WO | 2012/153197 A3 | 11/2012 | |
| WO | 2012/153197 A4 | 11/2012 | |
| WO | 2012/160446 A2 | 11/2012 | |
| WO | 2012/160446 A3 | 11/2012 | |
| WO | 2012/160446 A4 | 11/2012 | |
| WO | 2012/164387 A1 | 12/2012 | |
| WO | 2012/164387 A4 | 12/2012 | |
| WO | 2013/027127 A4 | 12/2012 | |
| WO | 2013/027127 A2 | 2/2013 | |

OTHER PUBLICATIONS

IEA Wind 1989 Annual Report.
IEA Wind 1990 Annual Report.
IEA Wind 1992 Annual Report.
IEA Wind LS WECS 1988 Annual Report.
IEA Wind LS WECS 1989 Annual Report.
International Preliminary Search Report on Patentability for PCT/IB2012/001015 dated Nov. 12, 2013, (8 pages).
International Preliminary Search Report on Patentability for PCT/IB2012/001041 dated Nov. 5, 2013, (14 pages).
International Preliminary Search Report on Patentability for PCT/IB2012/001106 dated Dec. 2, 2013, (10 pages).
International Preliminary Search Report on Patentability for PCT/IB2012/001118 dated Nov. 26, 2013, (13 pages).
International Preliminary Search Report on Patentability for PCT/IB2012/001183 dated Nov. 12, 2013, (14 pages).
International Preliminary Search Report on Patentability for PCT/IB2012/002704 dated Nov. 12, 2013, (15 pages).
Wind Stats Report 2011.

\* cited by examiner

WIND TURBINE CONTROL SYSTEM HAVING A THRUST SENSOR

REFERENCE TO RELATED APPLICATIONS

This application claims priority to U.S. Provisional Application No. 61/490,765, filed May 27, 2011, the contents of which is incorporated herein in its entirety.

FIELD OF THE INVENTION

The invention generally relates to controlling wind turbines, especially in conditions of extreme or variable winds.

BACKGROUND

Wind energy is an attractive alternative to fossil fuels because it is plentiful, renewable, widely distributed, clean, and produces no greenhouse gas emissions. In order to maximize electrical generation, wind turbines are typically sited in high-wind areas such as mountainsides and canyons. Wind turbines are also sited offshore, to harness strong coastal winds.

The wind harnessed for power generation can also damage a turbine, however. While stronger winds generate more power, high and fast wind speed and direction change, e.g. extreme gusts, may generate tremendous stress on the components of the turbine. In particular, blades, hubs, and gearboxes are vulnerable to stress-related failure. By advanced materials and precision engineering, large, modern turbines can achieve reliable performance in wind speeds up to 30 m/s. Nonetheless, every wind turbine has a cut-out wind speed above which the turbine cannot safely operate for extended periods. If the speed of the wind substantially exceeds the cut-out wind speed while the turbine is producing, the turbine can lose its capability to control shaft torque and/or running speed and can be damaged, resulting in downtime and costly repairs. Also when the operating turbine is reached by an extreme gust, the turbine can be damaged if its control system doesn't respond promptly to bring it to shut down.

For example in the event of very rapid variation of wind speed and or wind direction (specifically in the case of the extreme coherent gust with wind direction change or other extreme gusts), the safe limits of rotor aerodynamic torque and speed can be exceeded, even after the control system starts the shut down (when based on shaft over-speed sensor). This can result in dangerous stresses on the blades, hub, drive train, and other subsystems—all of which can result in turbine failure.

To avoid damage in high winds, many wind turbines have rotor speed sensors which sense the speed of the rotor shaft, for example, through a speed pick-up, which is used for power control and for shutdown. In such wind turbines, a braking system is activated in the event of shaft over-speed. The response of the running speed lags the variation of the aerodynamic torque, however, because of the inertia of the rotor. Thus, the corrective action is not initiated until well after the onset of the wind event.

Thus, there is a need for a control system that can instantaneously sense rapid variations in wind speed seen by the rotor and initiate corrective action.

SUMMARY

The invention provides wind turbine control systems to instantaneously detect increased thrust loads and initiate corrective action. In many instances, the increased thrust load results from a variation in the wind speed or direction, for example from a sustained gust or storm. The system can initiate a corrective action to limit the overshoot of the rotor speed by activating a braking system. The corrective action may lead to a shutdown. In some embodiments, the thrust sensor comprises an axial load sensor or a combined torque/thrust sensor.

Once an increase in thrust load is sensed, the control system can activate the blade pitch mechanism in the pitch control turbines or the yaw actuation mechanism in the yaw control turbines and/or also a mechanical or electrical (or regenerative) braking system coupled to the rotor shaft to reduce the growth rate of the rotor speed. In most of the wind turbines the control system initiates the actuation of the braking system when the rotor running speed reaches a threshold (over-speed set point) which value is set so that the overshoot of the rotor speed transient should not reach the design limit.

However by considering the transient behavior due to extreme gusts it may be necessary to lower the over-speed set point at a value that might cause not wanted shutdown in normal operation.

This risk can be mitigated or removed by using the signal of a sensor which responds immediately to any variation of wind speed, without or with little inertia, while the sensed running speed is delayed by the mass inertia of the rotor and drive train.

In the event a thrust load increase exceeds a safe limit, i.e. an over-thrust threshold, the controller can initiate turbine shut down, through the braking system e.g. by using the pitch control system or the yaw control system and/or also a braking system coupled to the rotor shaft. In some embodiments, the controller receives measurements of the shaft running speed during activation of the braking system and uses the speed measurements to calculate a deceleration of the rotor shaft. The controller then modulates the braking system as needed to keep the deceleration rate below a maximum allowed level.

The invention is useful for any wind turbine.

DETAILED DESCRIPTION

In many wind turbines, the braking system is activated by the shaft over-speed threshold through a speed pick-up. In such systems the response of the running speed lags any variation of the aerodynamic torque because of the inertia of the rotor, therefore, activation of the braking is delayed, leading to a higher overshoot of the operating parameters (and drive train loads). Such overshoot conditions can result in damaging stresses on the turbine and subsystems. In contrast, the invention provides wind turbine control systems capable of instantaneously detecting increased thrust loads on a wind turbine due to changes in wind speed.

Increasing wind speeds result in an axial force down the rotor shaft prior to an increase in the rotor speed due to the increased wind energy. By measuring axial load changes in real time, it is possible to initiate corrective actions as soon as the wind changes, decreasing the chance of turbine overload. The corrective action may be reducing the growth rate of the rotor shaft speed or shutting down the turbine by activating a braking system.

Thrust sensors suitable for use with the invention may be axial load sensors. Axial load sensors can be arranged in the support of the axial bearing of the rotor shaft and may be continuously monitored by a turbine monitoring and control system. Axial load sensors may be bearing assemblies with torque and thrust sensors integrated within. The axial load sensors output a signal indicative of the axial load on the rotor shaft. The signal is received by a turbine controller. In some embodiments, it is beneficial to incorporate redundant thrust sensors into the system to avoid maintenance in the event that one or more sensors fail.

A time-dependent increase in axial load received by the turbine controller is indicative of an increased wind speed and will result in activation of a braking system. In the event the axial load exceeds an over-thrust signal, shutdown procedures will be initiated.

Thrust sensors suitable for use with the invention may also comprise pressure sensors, for example piezoelectric sensors. The sensors may be in contact with, or incorporated into, the rotor shaft or its supports, or the sensors may be in contact with, or incorporated into, the rotor blades or the hub. In a teetering hub turbine with elastomeric teeter bearings, the sensors may be coupled to the teeter bearings, thereby providing a measurement of the axial load.

Figure 1:
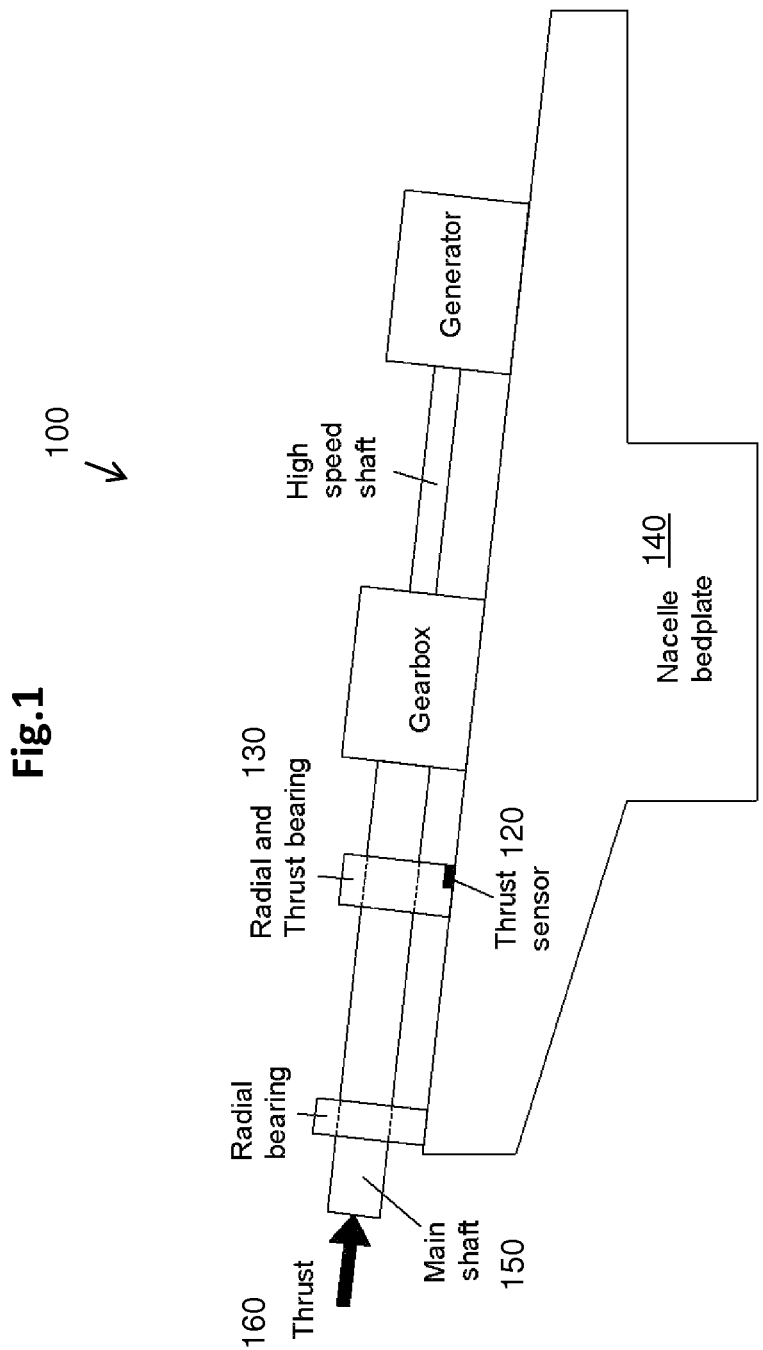
FIG. 1 is a diagram of a wind turbine rotor shaft comprising a thrust sensor.

An exemplary rotor shaft assembly 100 comprising a thrust sensor 120 is shown in FIG. 1. The thrust sensor 120 is located at an interface between the radial and thrust bearing 130 and the bedplate 140. According to this arrangement, the thrust sensor 120 is able to measure an axial load on the main shaft 150 due to increased thrust 160 on the main shaft 150. By activating a braking system (not shown) it is possible to avoid a speed overshoot condition that can result in overloading the turbine components. The invention applies to turbines with or without gearboxes.

Figure 2:
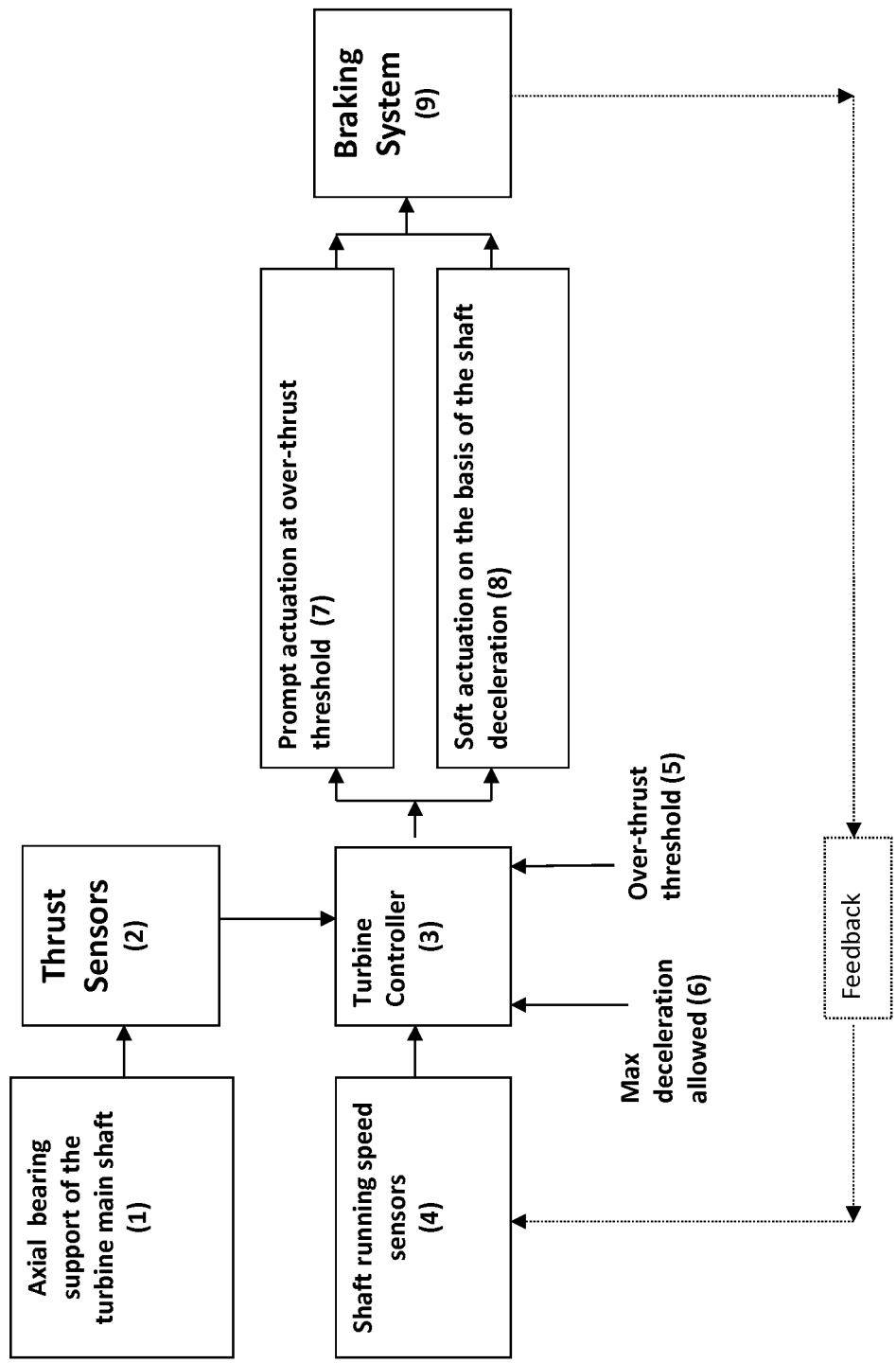
FIG. 2 is an embodiment of a wind turbine control system of the invention.
Figure 3:
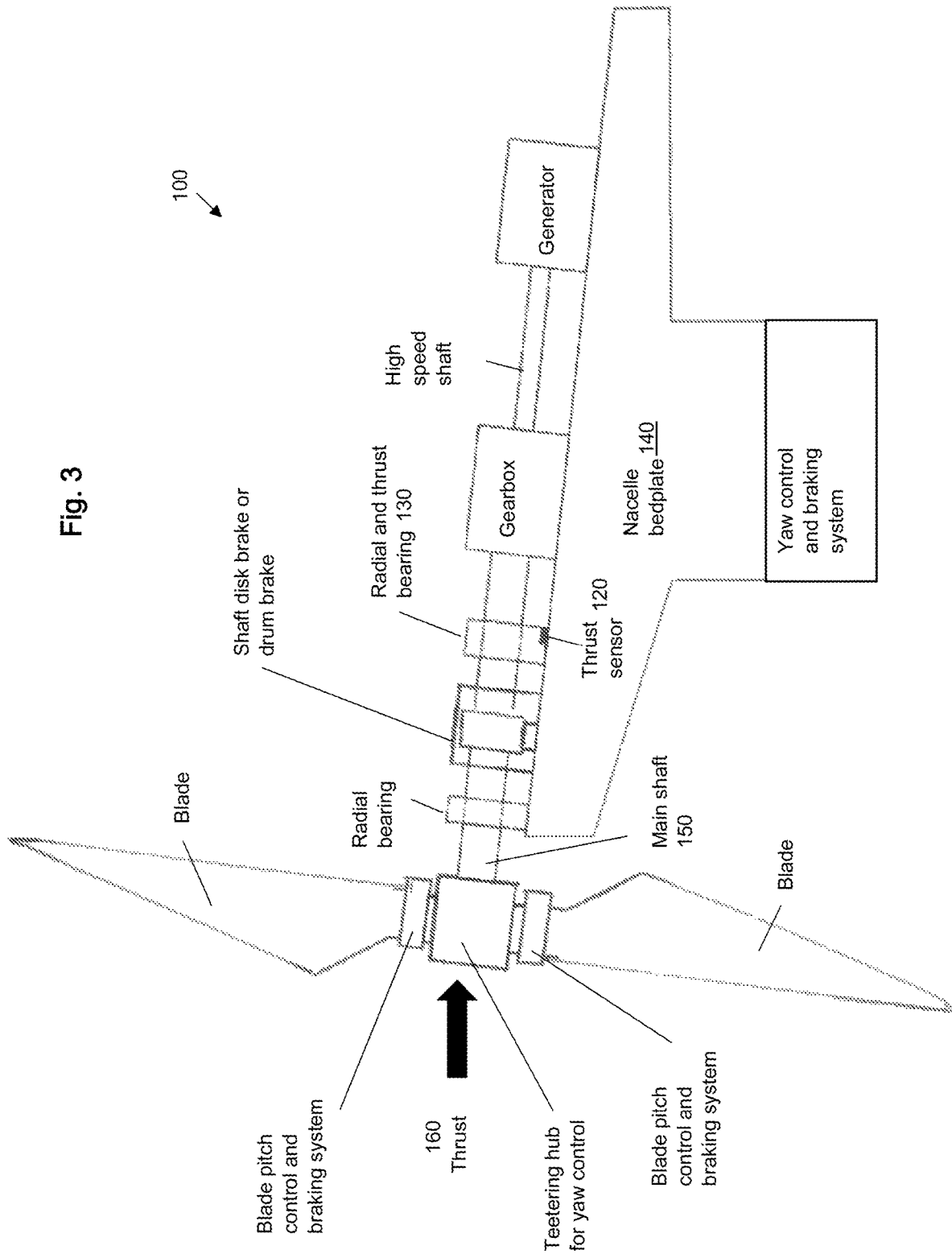
FIG. 3 is an embodiment of a wind turbine control system according to the invention.

An embodiment of a wind turbine control system of the invention is shown in FIG. 2. Thrust sensors 2 are in communication with the axial bearing support of the turbine main shaft 1, i.e., as shown in FIG. 1. The thrust load sensors 2 detect the axial load transferred by the shaft to the bedplate.

A signal from the thrust load sensors 2 is sent to the turbine controller 3. The turbine controller 3 also receives a shaft running speed signal output by the shaft running speed sensors 4. The turbine controller 3 compares the detected thrust load with a defined over-thrust threshold 5. Using the shaft running speed signal, the turbine controller 3 calculates the acceleration/deceleration of the running rotor. For example, the controller may receive a first shaft running speed at a first time and a second shaft running speed at a second time, and calculate a deceleration based upon the difference of the first and second shaft running speeds over the difference of the first and second times. The turbine controller 3 then compares the calculated deceleration with the maximum deceleration allowed 6. The maximum deceleration may be input by a user on the basis of a design value and may be adjusted in operation on the basis of the turbine testing results.

When the thrust load reaches the over-thrust threshold 5, the turbine controller 3 promptly initiates 7 the braking system 9. The braking system 9 may comprise a yaw control system alone or operably coupled to a mechanical braking system, for example a drum or disc brake, or an electrical braking system, for example inverter torque control or resistive braking, or a combination of both.

In some embodiments, the braking system 9 may comprise a pitch control system alone or operably coupled to a mechanical braking system, for example a drum or disc brake, or an electrical braking system, for example inverter torque control or resistive braking, or a combination of both.

A yaw control system suitable for use with a wind turbine control system of the invention in a two-bladed teetering hinge turbine is described in PCT/US2012/36637, "Systems for Minimizing Yaw Torque Needed to Control Power Output in Two-Bladed, Teetering Hinge Wind Turbines that Control Power Output by Yawing" filed May 4, 2012, and incorporated by reference herein in its entirety.

If the turbine controller 3 determines that the calculated deceleration is greater than the maximum deceleration allowed 6 (above), the turbine controller 3 can command the braking system 9 to modulate the braking torque softly 8 with a deceleration not higher than the max deceleration allowed 6. In some embodiments, a hydraulic braking system will be used to provide for softer braking of the rotor shaft.

In an alternative embodiment, an additional function of turbine controller 3 would be to manage an over-speed condition, e.g. by monitoring an over-speed threshold. Such a system would be able to brake the shaft rotor in the event that the over-speed threshold was reached before the over-thrust threshold. Such a condition would be rare, but likely indicative of a mechanical failure within the drive train.

Thus the invention provides a wind turbine control system for decelerating the rotor shaft in the event of an increased thrust load, typically caused by an extreme gust, storm, hurricane, or typhoon. The systems provided have faster response time than rotor speed sensor based systems, and therefore, can prevent damage to the wind turbine during extreme wind events.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein. Scope of the invention is thus indicated by the appended claims rather than by the foregoing description, and all changes which come within the meaning and range of equivalency of the claims are therefore intended to be embraced therein.

The invention claimed is:

1. A wind turbine control system comprising:
    an axial thrust sensor integrated in a bearing assembly of a rotor shaft;
    a braking system coupled to the rotor shaft; and
    a turbine controller that regulates a rate of deceleration of the rotor shaft so not to exceed a maximum allowed deceleration rate,
    wherein the braking system is activated when an axial thrust load is detected that exceeds an over-thrust threshold.

2. The wind turbine control system of claim 1, wherein the thrust sensor comprises a rotor axial load sensor.

3. The wind turbine control system of claim 1, wherein the axial thrust sensor is a torque/axial thrust sensor.

4. The wind turbine control system of claim 1, wherein the braking system comprises a blade pitch control system.

5. The wind turbine control system of claim 1, wherein the braking system comprises electrical braking.

6. The wind turbine control system of claim 5, wherein the braking system comprises mechanical braking actuating a disk or drum brake coupled to the rotor shaft.

7. The wind turbine control system of claim 6, wherein a wind turbine has two-blades and a teetering hub.

8. The wind turbine control system of claim 7, wherein the braking system is coupled to a yaw control system, and a yaw angle between wind speed direction and rotor axis is increased when the axial thrust load is detected.

9. A method of controlling speed of a rotor shaft of a wind turbine, comprising:
   sensing an axial thrust load integrated in a bearing assembly of the rotor shaft;
   measuring the axial thrust load;
   comparing the measured axial thrust load to an over-thrust threshold;
   calculating a deceleration rate of the rotor shaft;
   comparing the calculated deceleration rate to a maximum deceleration allowed;
   activating a braking system when the over-thrust threshold is exceeded; and
   modulating the braking system to cause an actual deceleration rate to be no greater than the maximum deceleration rate allowed.

* * * * *